(12) United States Patent
Gottfried

(10) Patent No.: US 6,270,011 B1
(45) Date of Patent: Aug. 7, 2001

(54) REMOTE CREDIT CARD AUTHENTICATION SYSTEM

(75) Inventor: Ofer Gottfried, Moshav Netaim (IL)

(73) Assignees: Benenson Tal; Mimoun Elie, both of Herzliya (IL); both of part interest ( * ) Notice: Subject to any disclaimer, the term of this patent is extended or adjusted under 35 U.S.C. 154(b) by 0 days.

(21) Appl. No.: 09/322,012

(22) Filed: May 28, 1999

Related U.S. Application Data

(60) Provisional application No. 60/087,068, filed on May 28, 1998.

(51) Int. Cl.$^7$ .................................................. G06F 17/60
(52) U.S. Cl. .......................... 235/379; 235/380; 380/25; 705/35
(58) Field of Search .................................. 235/379, 380, 235/382.5, 487; 380/25, 49, 54; 705/26, 35, 39

(56) References Cited

U.S. PATENT DOCUMENTS

| | | | |
|---|---|---|---|
| 4,210,899 | * 7/1980 | Swonger | 340/146.3 |
| 5,473,144 | * 12/1995 | Mathurin, Jr. | 235/380 |
| 5,648,648 | * 7/1997 | Chou et al. | 235/382 |
| 5,869,822 | * 2/1999 | Meadows, II et al. | 235/380 |

\* cited by examiner

*Primary Examiner*—Karl D. Frech
*Assistant Examiner*—Daniel St. Cyr
(74) *Attorney, Agent, or Firm*—Edward Langer, Pat. Atty.

(57) ABSTRACT

A method for providing secure transactions with credit cards by adding a fingerprint scanner at the point-of-sale to obtain fingerprint data, so that a credit card company database can verify the fingerprint data against stored fingerprint information and verify the transaction accordingly. The method is integrated into the existing negotiation protocol between a point-of-sale system and a credit card company database, and uses a human fingerprint and a secure algorithm. The credit card company has the customer fingerprint for comparison on its existing database, and the existing credit card operation will be usual, with the fingerprint data added to it to authenticate and secure the operation via the communication media while making a point-of-sale purchase. In the case of an Internet purchase, the inventive method incorporates an authorization adaptor connected to the user PC, and once the user has made the purchase request, an encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication, for authorization. The fingerprint scanner is based on use of a new sensor employing a technology that maps and matches fingerprints, using coincidence of the features (minutia) on as few as twelve similar points, to determine a match.

17 Claims, 6 Drawing Sheets

REMOTE CREDIT CARD AUTHENTICATION SYSTEM

This Application claims the benefit of Provisional No. 60/087,068 filed May 28, 1998.

FIELD OF THE INVENTION

The present invention relates to credit card purchase authorization systems, and more particularly, to a secure system for authorizing credit card purchasing transactions at the point-of-sale or over the Internet, utilizing fingerprint information to significantly enhance the level of security by authenticating the identity of the card user, to insure that this is also the card owner.

BACKGROUND OF THE INVENTION

Remote banking operations, product purchasing transactions and other electronic authentication procedures performed through the telephone network, Internet data network, or other communication media require a high level of security that is not fully achieved with existing equipment and techniques.

Credit card purchasing in point-of-sale systems is not completely safe and the system is exposed to computer hackers and other fraudulent activities. Credit card identification fraud is very common and very costly. Credit card companies report spending hundreds of millions of dollars every year because of this problem.

In existing credit card security systems, heavy reliance is placed on the possession of the card itself and identification numbers that the user must protect and remember. These identification techniques lead to problems if the card is stolen and the identification number is copied or forgotten. Those numbers are sent through the communcation media with limited security or certainty that the purchase is being made by the right person, who legally posseses the card and is authorized to use it.

Futhermore, at regular point-of-sale locations in stores where credit card are routinely used for purchasing transactions, the authentication techniques are very limited and there are many instances of card forgery costing credit card companies millions of dollars. Typically in these systems, the credit card is read at the point-of-sale and the purchase information is communicated by a modem using a standard V.32 protocol over the telephone lines to a Credit Card Center, which has a database. The database analyzes the transaction and send a reply which allows for the transaction to be completed by acknowledging the credit card and authorizing the transaction.

As mentioned above, the telephone line authorization procedure may be interfered with, and this would leave the point-of-sale vulnerable to fraudulent activities.

In U.S. Pat. No. 5,513,272 to Bogosian, there is disclosed a system for verifying the authorized user of a credit card having a fingerprint of the card owner stored on the information strip of the card. The card user provides his fingerprint via a scanning device, and the information is compared with the owner's stored fingerprint on the card and with a database-stored owner fingerprint, by communications employing an encryption technique-between the fingerprint scanner and the database. In addition and prior to this, as part of a required procedure, the card's information strip is read, and the card itself is scanned to obtain a digital numeric sequence representing the surface of the card, and this is also compared with a database-stored card image surface. An additional comparison is made of a photograph of the card owner and a database-stored photograph. Voice recognition and retinal scanning may also be used to increase the level of verification.

The system described in the Bogosian patent is overly complicated, time consuming and costly, requiring several layers of verification for cross-checking beginning with reading the card, scanning of the card image and the fingerprint, with optional voice recognition, retinal scanning and photographic scanning. The encryption techniques are described at the level used for automatic bank teller machines, which are simplified protocols not involving the use of token keys. The patent does not describe the use of existing communications for credit card authorization via a modem.

In addition, use of the card information strip for storage of the card owner's fingerprint data presents the risk of a breach in security, if the card is lost or stolen, since the fingerprint data is available right on the card. The fingerprint scanning technology available when the Bogosian patent was filed in 1994 used an optical reader with complex optics, which is not very accurate and requires a very long time to process fingerprint data.

The current practice used for purchases over the Internet is also subject to fraudulent activities, since it depends on a similar approach to that of the point-of-sale purchase, beginning with the user PC sending credit card information to the website offering the sale. The information is then sent to the credit card company database for authorization, and the reply allows completion of the transaction by acknowledging the credit card and authorizing the transaction, or refusing authorization.

The entire purchase transaction can be encrypted or not according to the country or company, using a private or public encryption key. The user may also provide a password or user ID, but if the key or password is discovered by another, it can be used for non-legitimate purchases, and fraudulent activities.

Therefore, it would be desirable to provide a method of enhancing the security of credit card transactions conducted via point-of-sale or Internet purchase authorization systems, to eliminate the potential for fraudulent activities by verifying the identity of user of the card, and to avoid use of stolen credit cards by others.

It would also be desirable to protect the communications between the point-of-sale system and the credit card database, or between the user and the credit card database in the case of Internet purchases, so that no interference is possible.

SUMMARY OF THE INVENTION

Accordingly, it is a principal object of the present invention to overcome the disadvantages associated with existing credit card authentication systems and provide a an ultimate remote authentication system (URAS) which is a method for providing secure transactions with credit cards by adding a fingerprint scanner at the point-of-sale to obtain fingerprint data, so that the credit card company database can verify the fingerprint data against stored fingerprint information and verify the transaction accordingly. The URAS is integrated into the existing negotiation protocol between a point-of-sale system and a credit card company database.

In accordance with a preferred embodiment of the present invention, there is provided a method for remote credit card authentication comprising the steps of:

initiating a purchase transaction in which a purchaser provides credit card information from a purchaser location;

communicating said credit card information to a credit card database;

requesting provision of personal information associated with said purchaser;

obtaining said personal information, including at least one fingerprint, from the purchaser at said purchaser location;

communicating said personal information to said credit card database;

processing said personal information in said credit card database to match it with said credit card information; and providing an authorization message to said purchaser location for completion of said purchase transaction.

The URAS operation is based on use of a human fingerprint and a secure algorithm for identifying the operation through the transmission media. The credit card company will have on the existing database, the customer fingerprint and at the point-of-sale a fingerprint scanner will be used. The existing credit card operation will be as usual and the fingerprint data will thus be added to it. The URAS uses the customer fingerprint data and the secure algorithm to authenticate and secure the operation via the communication media while making a point-of-sale purchase.

In the case of an Internet purchase, the inventive URAS incorporates an authorization adaptor connected to the user PC, and once the user has made the purchase request, the credit card company is contacted for an authorization. An encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication. Authorization is then provided if the credit card company confirms the authenticity of the information.

The fingerprint scanner operation and the small size of the data associated with the fingerprint is based on use of a new sensor and software of a technology that maps and matches fingerprints, using a solid-state sensor and software provided by VERIDICOM company, a subsidiary of Bell Laboratories and Lucent Technologies. The sensor represents a breakthrough in fingerprint identication systems.

Fingerprint identification, which is a widely accepted personal identification method for over 100 years, is based on the fact that ridge characteristics such as ridge endings and ridge bifurcations (commonly referred to as minutia) are unchangeable and repeatable features of each individually unique fingerprint. Comparison of two fingerprints to show the coincidence of the features (minutia) can be achieved on as few as 12 similar points, to determine a match. Forensic fingerprint identification systems in use today are able to match these minutia in the fingerprint images. Automated systems using image capture, image processing and feature coincidence matching are part of the technology which is now available as described above.

Unlike with the Bogosian patent described in the Background, the inventive system does not require modification of the existing credit card format, thus reducing the risk of theft and tampering, since the card does not include fingerprint data. The authentication procedure is simple and practical, without additional cross-checking, as the fingerprint data encrypted using a one-time token provides a high level of security. The fingerprint scanning technology is more accurate than the optical scanning described in the Bogosian patent, and the time for the procedure is also kept to a minimum, making the purchase an efficient one from the purchaser's point of view. Internet purchases, not mentioned by Bogosian, are also handled securely.

The inventive system provides a practical, low-cost method of significantly increasing the security level of credit card transactions, and can be easily adapted to existing systems, or provided as a replacement system.

The inventive system is also useful for identifying individuals in remote financial or banking transactions, or other situtations where user authentication is required.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1:
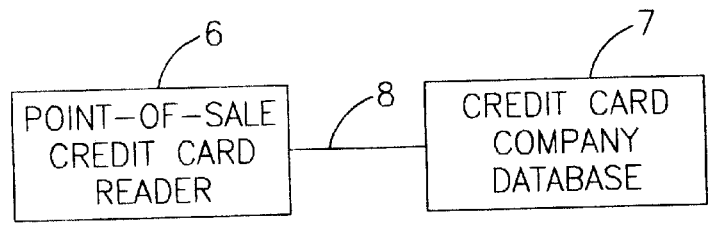
FIG. 1 is a schematic block diagram of a prior art credit card authorization system.

Referring now to FIG. 1, there is shown a schematic block diagram of a prior art credit card authorization system, comprising a point-of-sale credit card reader 6, and a credit card company database 7 connected by a telephone line 8. According to existing protocols, reader 6 and database 7 communicate to enable authorization of purchases using the credit card. As used herein, the term "credit card" includes variations of the standard format, such as Smartcards, or identification cards.

Figure 2:
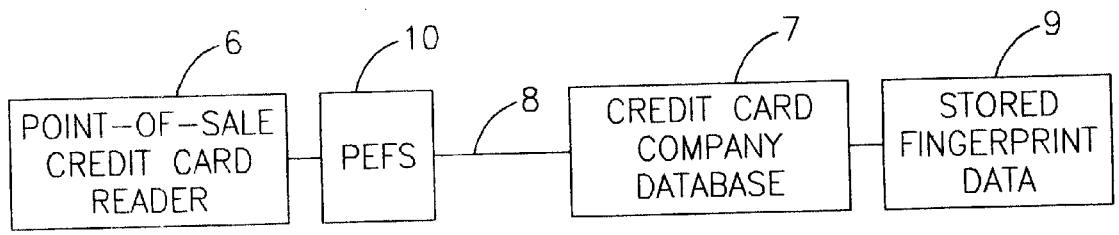
FIG. 2 is a schematic block diagram of a credit card authorization system constructed in accordance with the principles of the present invention.

In FIG. 2, there is shown a schematic block diagram of a credit card authentication system constructed in accordance with the principles of the present invention, comprising a point-of-sale credit card reader 6, and a credit card company database 7 connected by a telephone line 8, in addition to a PEFS module 10 (described further herein) and storage unit 9 for fingerprint data.

Figure 3:
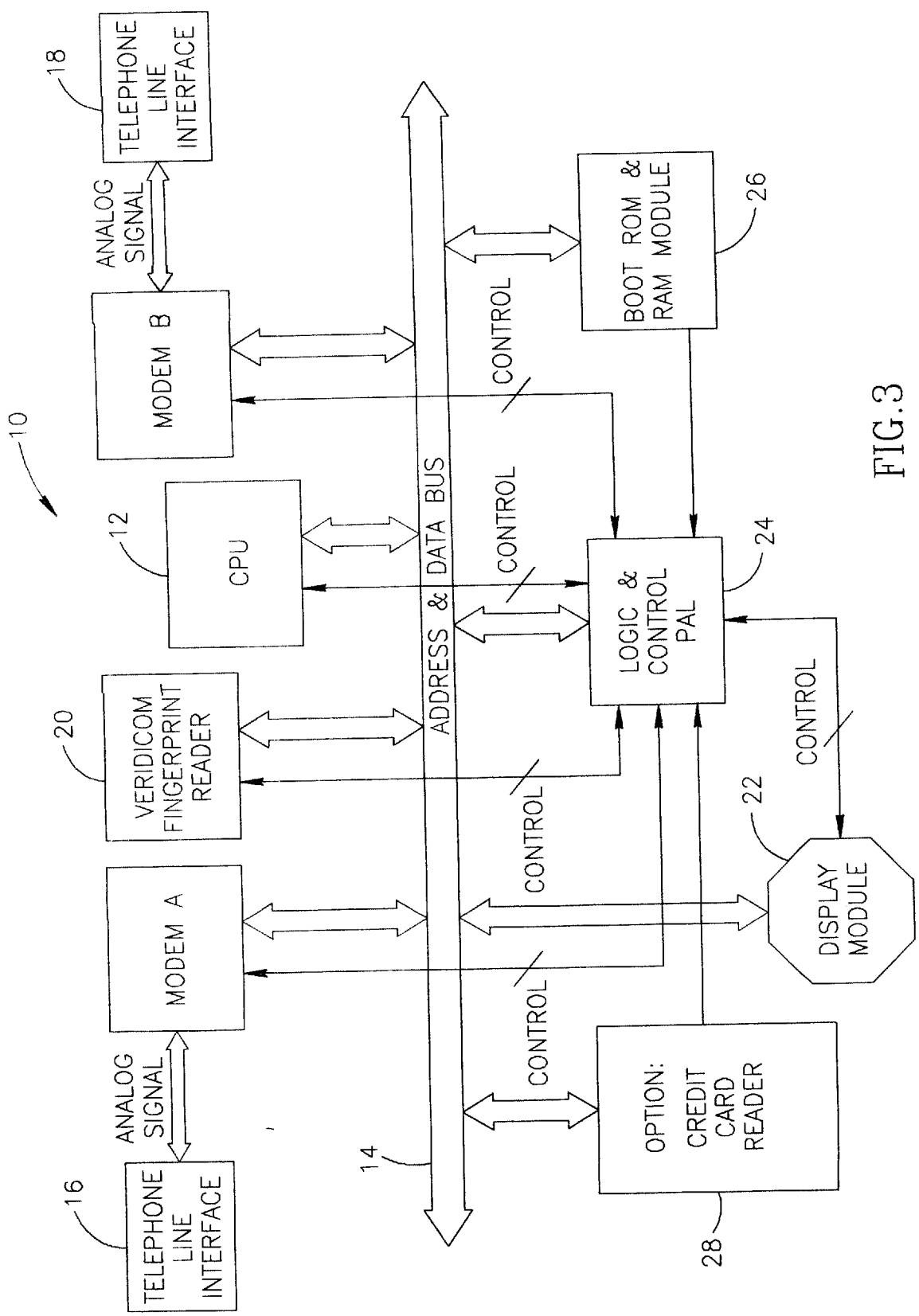
FIG. 3 is an electronic schematic block diagram of a preferred embodiment of a remote credit card authentication system constructed and operated in accordance with the principles of the present invention.

Referring now to FIG. 3, there is shown an electronic schematic block diagram of a preferred embodiment of a remote credit card authentication system constructed and operated in accordance with the principles of the present invention. The method for providing secure transactions is based on use of a PEFS module 10 (Protocol, Encryption, Fingerprint, Scanner module) which is incorporated at the point-of-sale, and is connected between the point-of-sale system (POSS) and the credit card company database (CCCDB). PEFS 10 is built around a central processor CPU 12 which controls all of the PEFS functions as further described herein, via a data and address bus 14 which controls all of the peripheral components.

PEFS 10 comprises a pair of telephone line interfaces 16, 18 which respectively couple PEFS 10 to wired or wireless telephone lines to enable communications between modem A and the POSS, and between modem B and the CCCDB. Both modems A, B can be Conexant (Rockwell) type MD32 or a compatible type, using a V.32 standard analog data pump modem, which is controlled by CPU 12 and initialized to the V.32 protocol, A fingerprint reader module 20 comprising the Veridicom FPS-100 sensor is designed to communicate directly with the CPU data and address bus 14. The CPU 12 initializes and controls the EPS-100 and the fingerprint data collection A display module 22 comprises two or more LCD type displays and a few color LEDs which provide for status indication information. A programmable array logic chip 24 such as an Altera FX840/880 or equivalent is provided for address and chip selection and other control signals. A boot and application software ROM and RAM module 26 is provided for initialization of CPU 12 functions. An optional credit card reader 28 can be provided in the PEFS module 10.

The CPU 12 can be implemented by a 386EX or microcontroller such as Motorola M8086 or equivalent. The CPU 12 controls all of the PEFS functions:

1) Initialization procedure
2) Modem communication
3) Protocol Handling to POSS and CCCDB
4) Fingerprint Scanner and minutia calculation software
5) Display
6) Encryption procedure The functional requirements of the CPU 12 are characterized by a high speed (approx. 25 Mhz), with 128/512 K application and boot ROM (socket) and a 4–16 M data RAM.

The URAS system may be integrated into the existing POSS and existing CCCDB systems in one of two ways, one with minimum changes offering secure transactions and one with additional modifications to the negotiation protocol but with extra security. These different approaches to integration are explained with respect to FIG. 4.

Figure 4:
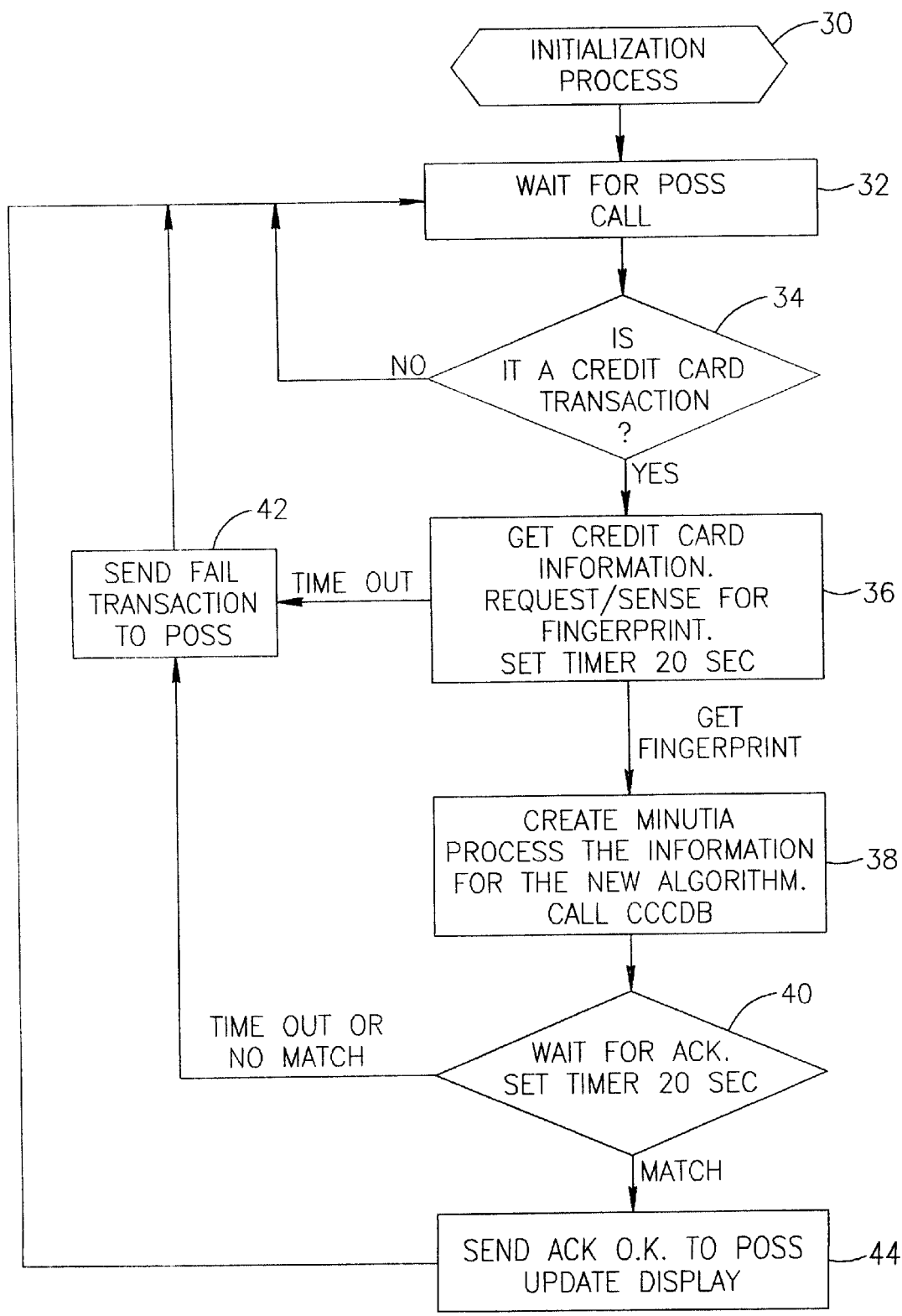
FIG. 4 is a flowchart describing the operation of the system of FIGS. 2–3.

In FIG. 4, there is shown a flowchart of the algorithm controlling operation of the URAS system of FIGS. 2–3. The flowchart of the secure transaction authorization process begins with initialization in block 30 of the various peripherals in the system according to their product specfication, with a self-check procedure. This includes the CPU 12, the display 22, the Veridicom fingerprint reader module 20, the modems A and B, and the programmable array logic chip 24 and optional credit card reader 28. The PEFS module 10 monitors the POSS all the time, and will communicate with it to get the credit card and purchase information.

The general outline of the procedure includes a request by PEFS module 10 to obtain the fingerprint data, while it holds the telephone line with the point-of-sale system and starts the communication with the new protocol to the credit card company database. At the end of the negotiation protocol between the credit card database and the PEFS module 10, a reply is sent by PEFS module 10 to the point-of-sale system, authorizing or denying the transaction.

In block 32, PEFS module 10 begins by waiting for an incoming call from the modem A at the POSS, where PEFS module 10 is at the same location. The PEFS module 10 is acting as a mediator before the contact with the credit card company database is effected, and the connection process between the PEFS module 10 and the point-of-sale reader now begins. When an off-hook signal is detected, meaning an incoming call has been received, the modem A is synchronized and the data transaction begins, at which time it is determined if this is a credit card transaction or not. In block 34, if in fact a credit card transaction is involved, the PEFS module 10 accepts the information coming over the telephone line, and if it is in the proper mode and sequence, then it will recognize it as a credit card transaction. The information must be in the protocol format for the PEFS module 10 to recognize it as a credit card transaction.

Once block 34 has been executed, in block 36 the credit card information is obtained over the phone lines, and with the normal transaction processing, for those pieces of information, such as the credit card number, the amount of the purchase, etc. In addition to these pieces of information, in block 36 a request is sent to the PEFS module 10 display for fingerprint data. Now that the credit card information is obtained by PEFS module 10, it requests fingerprint data by placing a notice on display module 22 which is on PEFS module 10 itself, so that the operator of the PEFS module 10 now has to create fingerprint data by placing his finger on the reader or the scanner of the PEFS module 10. The timer is set for proceeding and making the fingerprint scan.

After this information is entered into PEFS module 10, the process continues in block 38 by having the PEFS scanner obtain the minutia, which as described in the Summary, is the profile or abstract of the fingerprint. This abstract contains the important unique information included in the entire scan, so that the abstract is a smaller subset of all the data that was obtained in the entire scan. The CPU 12 of PEFS module 10 analyzes this, and once it creates this subset of data from the entire scan, a picture of the fingerprint can be sent to the database in one of two ways, either as an additional field in the existing negotiation protocol between the point of sale and the database, by simply adding fingerprint data at the end of this protocol, or alternatively, as an encrypted communication.

In the alternative method, an encrypted communication begins between the point-of-sale and the database, which is achieved by an exchange of a one-time key or token at the beginning of the protocol between the point-of-sale and the database. This key is used to encrypt all of the call information, and the unique codes of the key are also used to decrypt it on the other end. The unique codes of this key are specific and useful only for this particular protocol and this particular call between the point-of-sale and the database. The key typically contains random information and the time, date, location etc. and is generated at the credit card database location for use in an encryption algorithm to insure the uniqueness of the transaction for over 100 years. This key is sent back to the point-of-sale for use in encrypting the data that is now to be sent from the point-of-sale to the database.

The one-time call key or token is a different one for each call, and can be generated by a random number generator at the credit card database. In case of failure during the negotiation, a new call key is used. The whole negotiation can also be encrypted by a different predetermined encryption algorithm known to both the PEFS module 10 and the credit card database.

Now the credit card database has received fingerprint data from the point-of-sale in either of two formats, encrypted, or as a new header indicating there is fingerprint data on the end of an existing protocol, and in block 40, a timer is set for about 20 seconds during which the fingerprint data is processed to provide an acknowledgement back to the point-of-sale that the fingerprint data matches that which is associated with the specific credit card information. The fingerprint data is stored in the credit card company database from the beginning, so that the credit card database always possesses the credit card information and the fingerprint data which is associated with it. The database must match the fingerprint data with the data which has been received from the point-of-sale, and if those two things match, an acknowledgement is received at the point-of-sale. If the timer times out or no match is achieved, in block 42 a transaction failed message is sent to the point-of-sale system.

If the match is achieved, in the last block 42 the display in the local point-of-sale system is updated to show the user that an acknowledgement has been received, and the transaction can be completed. The acknowledgment is also encrypted by the key, and either it authorizes the transaction or denies the transaction based on the processing that has occurred.

The PEFS module 10 can be designed to simulate the regular negotiation protocol to the point-of-sale reader, and operate the new algorithm for the credit card database communication. An option is available to bypass the PEFS module 10 if needed. The PEFS module 10 can be designed for maximum flexibility and compatibility with existing point-of-sale readers with which it is to be integrated. It can be designed to replace the exisiting POSS or work with it as a mediator in communications with the credit card database. It is also possible to integrate the PEFS module 10 in the existing point-of-sale credit card reader.

The existing negotiation protocol between the credit card company database and the point-of-sale system will have to be modified to incorporate the fingerprint data in a field of information which is transmitted during the negotiation protocol. Each fingerprint image will require approximately 300 bytes of stored data.

For the approach in which the new header is added with the fingerprint data to the existing protocol, the header indicates that the inventive URAS is being used, and after the header, the fingerprint data is extracted and a matching process begins. The software for achieving this can be added as a DLL for multi-user operation, and the software is designed to provide a Match/No Match answer.

For the approach using encrypted communications, the entire negotiation protocol is changed. The credit card company database will be able to distinguish between the two approaches, and to work accordingly, according to the information contained in the protocol header. A new software packet is added that handles the encryption, decryption, call key and fingerprint matching according to the algorithm described with reference to FIG. 4. Modifications to the credit card company database include provision of a hard disc 9 for storage of fingerprint data, software modifications to the negotiation protocol and header format, and software for encryption/decryption of the communications and fingerprint matching.

The existing point-of-sale system will have to be modified in one of two ways. Either the existing credit card reader is replaced with a new one based on the PEFS module 10 and having fingerprint scanning capabilities, or the PEFS module 10 is used as a mediator between the existing point-of-sale credit card reader and the credit card company database. If used as a mediator, the PEFS module 10 communicates on one end with the existing point-of-sale system using the existing negotiation protocol and procedure, and on the other end with the credit card company database using the new algorithm and procedure as outlined in FIG. 4. Use of the PEFS module 10 provides protocol, encryption and fingerprint scanning capability as described above, and avoids the need to completely replace the hardware of the existing point-of-sale system, which is very costly.

Figure 5:
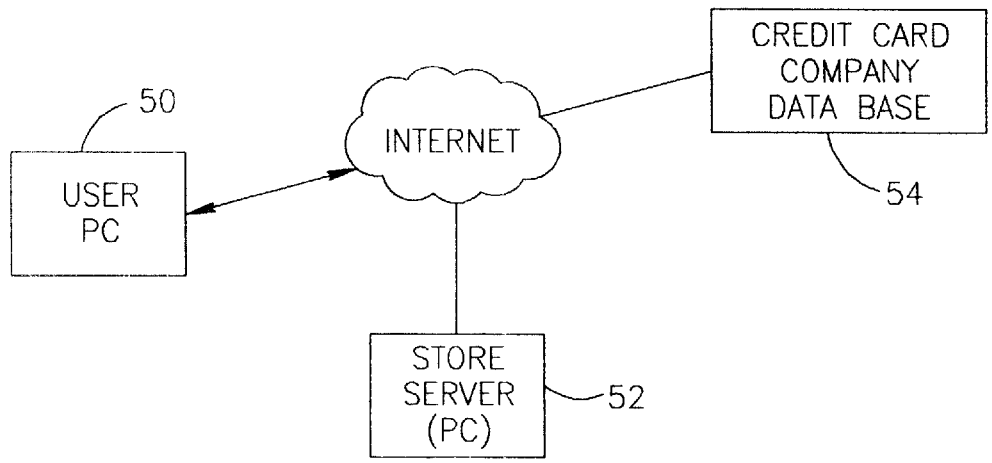
FIG. 5 is a schematic block diagram of a prior art Internet-based credit card authorization system.

Referring now to FIG. 5, there is shown a schematic block diagram of a prior art Internet-based credit card authorization system. In such a system, the user is connected via user PC 50 to a website represented by a store server 52, via the Internet. The user enters credit card information and sends a buy request via PC 50 to the store server 52, and the store server 52 transfers the information to the credit card company database server 54 for authorization. The authorization, whether approved or not, is sent to the store and then to the user, and the whole purchase transaction can be encrypted or not according to the country or company, using a public key or private key, or any other encryption method.

Today, the only way to insure that the purchase is being made by the owner of the card, is to use an ID number or a private key or password. If one of them is found by another person, he can use it to make fraudulent purchases.

Figure 6:
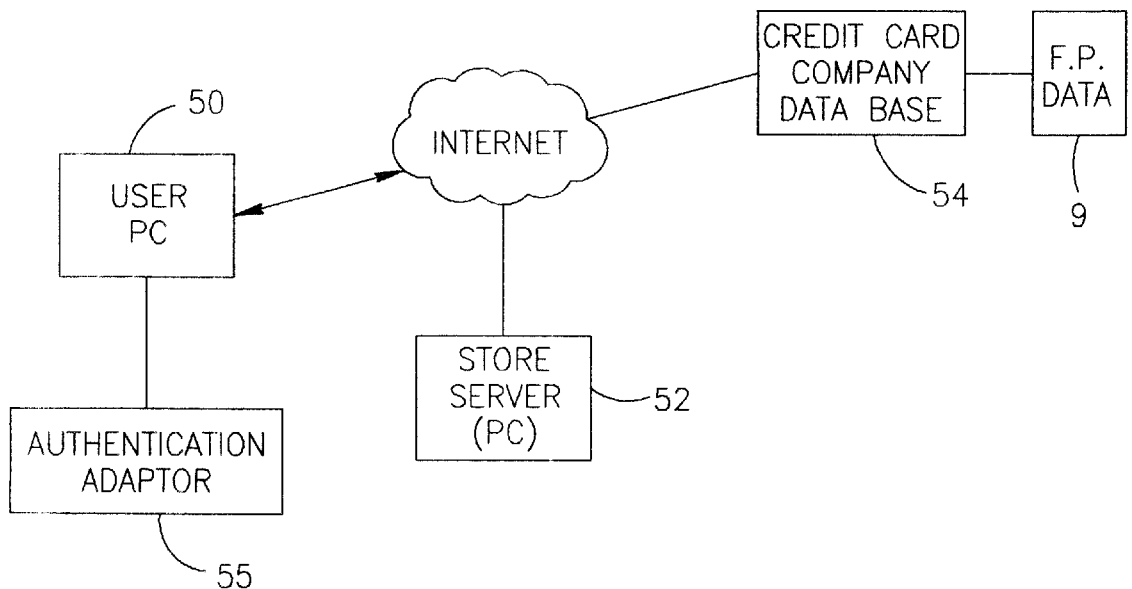
FIG. 6 is a schematic block diagram of an Internet-based credit card authorization adaptor system constructed in accordance with the principles of the present invention.

In FIG. 6, there is shown a schematic block diagram of an Internet-based credit card authorization system constructed in accordance with the principles of the present invention. In this arrangement, an authentication adaptor 55 and a storage unit 9 containing a fingerprint database are added to the system of FIG. 5.

Figure 7:
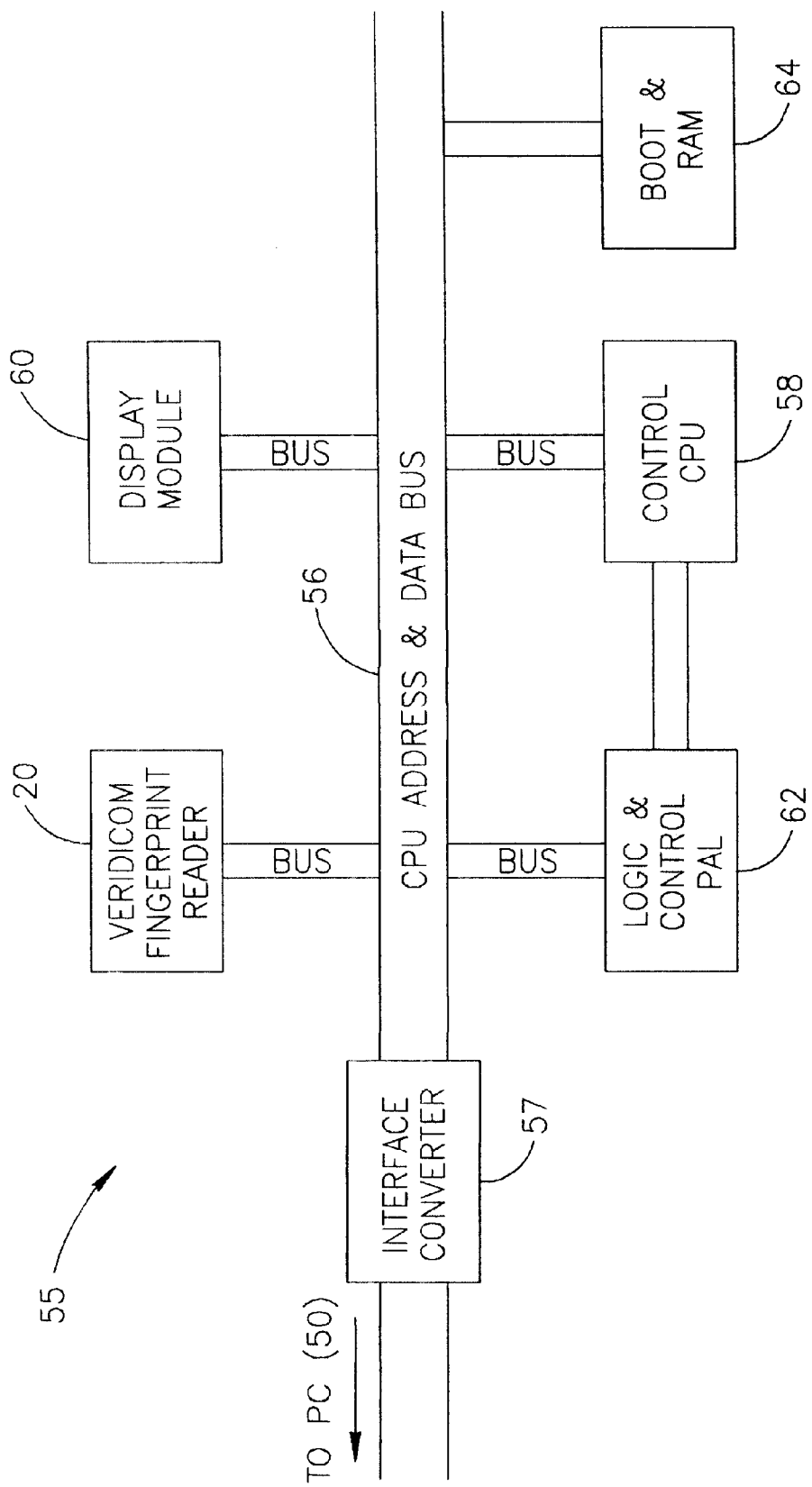
FIG. 7 is an electronic schematic block diagram of a preferred embodiment of the Internet-based credit card authentication adaptor system of FIG. 6.

In FIG. 7, there is shown an electronic schematic block diagram of a preferred embodiment of the Internet-based credit card authentication system of FIG. 6, featuring authentication adaptor 55. The authentication adaptor 55 comprises an interface converter for connection to the user PC 50 to allow for communications between them, in one of several modes including a parallel port to the CPU bus, RS-232 connection to the CPU bus, or any other options. Authentication adaptor 55 also comprises a fingerprint reader module 20 comprising the Varidicom EPS-100 chip, described in connection with FIG. 3, which is designed to communicate directly with the CPU data and address bus 56. The control CPU 58 initializes and controls the EPS-100 and the fingerprint data collection A display module 60 comprises two or more LCD type displays which enable instructions to be displayed for user interface activities, and a few color LEDs which provide for status indication information. A programmable array logic chip 62 such as an Altera FX840/880 or equivalent is provided for address and chip selection and other control signals. A boot and application software ROM and RAM module 64 is provided for initialization and execution of the application program controlling CPU 58 functions.

In accordance with the principles of the present invention, authentication adaptor 55 uses an operating system separate from the user PC 50, which communicates with the user PC 50 via an application protocol interface (API), using predefined commands. A driver in the user PC 50 provides implementation of the API protocol, enabling connection/communication with all PC 50 software programs.

Figure 8:
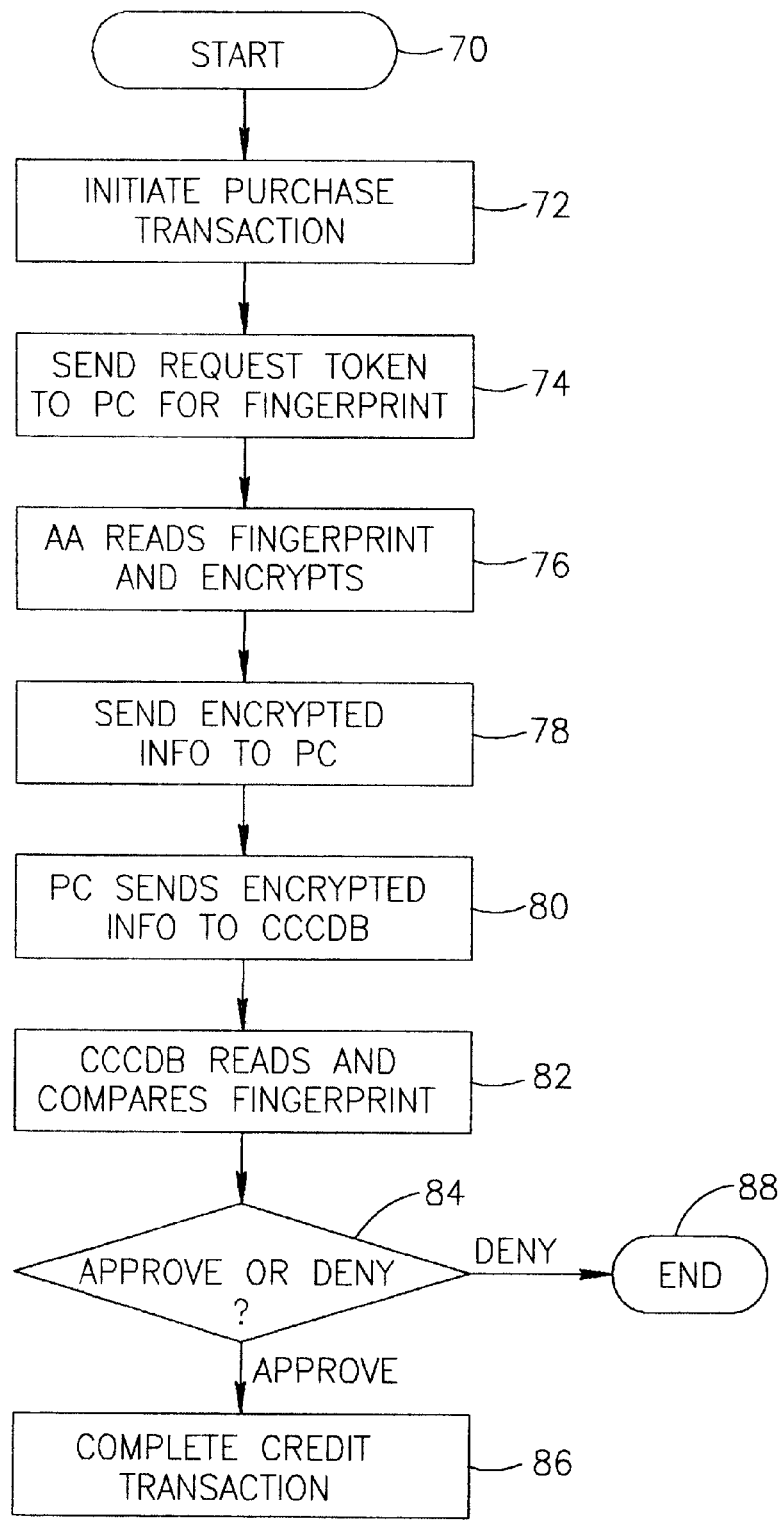
FIG. 8 is a flowchart describing the operation of the system of FIGS. 6–7.

In FIG. 8, there is shown a flowchart describing the operation of the system of FIGS. 6–7. In start block 70, the Internet-based credit card authentication system credit card system begins by initialization of the various peripherals in the system according to their product specfication, with a self-check procedure. In block 72, the user initiates a purchase transaction, by selecting the appropriate commands on a website offering purchases of goods and services, communicated via user PC 50 to the website represented by a store server 52, via the Internet. The user typically enters credit card information and sends a buy request via PC 50 to the store server 52. The credit card company database is contacted via the Internet through its server 54, and is notified to verify the credit card information for this purchase.

In block 74, the credit card company database sends a request including a one-time token for use in encryption to the user PC 50, which transfers it to the authentication adaptor 55, requesting fingerprint data related to the user making the purchase transaction. In block 76, the authentication adaptor 55 reads the user fingerprint and encrypts it with the token information, and in block 78 the encrypted information is sent to the user PC 50. In block 80, the user PC 50 in turn sends the encrypted fingerprint data information, via the Internet, to the credit card company database.

In block 82, the credit card company database reads the fingerprint information using the sent token and encryption/decryption algorithm and compares it to the fingerprint of the user, as in the store purchase transaction associated with the algorithm of FIG. 4. In block 84, the credit card company database approves or denies the transaction and an appropriate message, also encrypted with the token, is sent back to the store server 52, and to the user PC 50, completing the transaction in block 86, or ending the procedure in block 88. The entire transaction can be encrypted from the beginning with any known additional encryption method, providing a second level of security.

The Internet-based credit card authorization system described in FIGS. 6–8 permits the safe and secure completion of purchase transactions via the Internet, with the purchase being made using encrypted personal fingerprint information. This insures a high level of security since the seller (via the website) knows that the buyer's indentity has been validated. The authentication adaptor 55 prevents theft of the fingerprint information by encrypting it inside authentication adaptor 55, thereby preventing any accessibility to raw fingerprint data. Nothing is communicated to PC 50, which is vulnerable, without being encrypted within authentication adaptor 55, thus preventing unauthorized use of the fingerprint information.

Thus, in accordance with the principles of the present invention, a remote credit card authentication system can be provided as a practical, low-cost method of significantly increasing the security level of credit card purchase transactions, either at the point-of-sale or via the Internet, and the inventive system can be easily adapted to existing systems, or provided as a replacement system.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

I claim:

1. A method for remote credit card authentication comprising the steps of:

initiating a purchase transaction in which a purchaser provides credit card information from a purchaser location;

transmitting said credit card information to a credit card database;

requesting provision of personal information associated with said purchaser;

obtaining said personal information, including at least one fingerprint image, from the purchaser at said purchaser location, wherein said at least one fingerprint image is not included within the credit card information contained on the credit card;

processing said at least one fingerprint image in a stand-alone device, said stand-alone device being connected as an add-on unit whereat said purchase transaction is initiated;

transmitting said obtained personal information including said processed at least one fingerprint image to said credit card database;

processing, in said credit card database, said obtained personal information to match said personal information with stored personal information including at least one fingerprint image of the owner of the credit card; and providing a message to said purchaser location in accordance with the results of said processing step for completion of said purchase transaction.

2. The method of claim 1 wherein said initiating step is performed in a purchase transaction conducted at a point-of-sale purchaser location, arranged for conventional telephone line communication with said credit card database.

3. The method of claim 1 wherein said initiating step is performed in a purchase transaction conducted by a user on an Internet-based website from a purchaser location arranged for conventional telephone line communication with said credit card database.

4. The method of claim 1 wherein said step of requesting personal information is performed by displaying at said purchaser location, a request for purchaser fingerprint data.

5. The method of claim 1 wherein said step of obtaining said personal information comprises the step of scanning the purchaser's fingerprint and providing an image thereof at the purchaser location.

6. The method of claim 5 wherein said processing of said personal information includes the step of comparing minutia features of said scanned fingerprint image with a set of fingerprint data of the credit card owner stored in said credit card database.

7. The method of claim 1 wherein the steps of transmitting said credit card information and transmitting said obtained personal information are performed using a conventional modem and telephone communication line.

8. The method of claim 1 wherein the steps of transmitting said credit card information and transmitting said obtained personal information are performed using an Internet-based communcation line.

9. The method of claim 1 wherein said step of requesting personal information includes transmission of an encryption token for use in encrypting said obtained personal information for transmission to said database during said transmitting step.

10. The method of claim 9 wherein said encryption token contains unique information for one-time use only, such as date, time, location and the like.

11. A remote credit card authentication system comprising:

means for initiating a purchase transaction in which a purchaser provides credit card information from a purchaser location;

means for transmitting said credit card information to a credit card database;

means for requesting provision of personal information associated with said purchaser;

means for obtaining said personal information, including at least one fingerprint image, from the purchaser at said purchaser location, wherein said at least one fingerprint image is not included within the credit card information contained on the credit card;

means provided as a stand-alone device for processing said at least one fingerprint image, said stand-alone device being connected as an add-on unit to said means for initiating said purchase transaction;

means for transmitting said obtained personal information including said processed at least one fingerprint image to said credit card database;

means for processing, in said credit card database, said obtained personal information to match said personal information with stored personal information including at least one fingerprint image of the owner of the credit card; and means for providing a message to said purchaser location in accordance with the results of said processing step for completion of said purchase transaction.

12. The system of claim 11 wherein said means for initiating a purchase transaction comprises a standard credit card reader and said means for requesting and obtaining said personal information is a stand-alone device, adapted to operate with said standard credit card reader.

13. The system of claim 11 wherein said means for initiating a purchase transaction comprises a computer connected to an Internet-based website, and said means for requesting and obtaining said personal information is a stand-alone device, adapted to operate with said computer.

14. The system of claim 13 wherein said computer isolates said stand-alone device and does not enable said stand-alone device direct access to the Internet, thereby protecting said obtained personal information and allowing encryption of said personal information before transmission.

15. In an Internet-based purchasing environment comprising a website adapted for processing a user purchase transaction and a purchaser terminal for enabling such a purchase transaction, a method for remote credit card authentication comprising the steps of:

initiating the purchase transaction in which a purchaser provides credit card information from the purchaser terminal;

transmitting to a credit card database in a secured manner a request for a unique encryption token;

generating said encryption token;

transmitting said encryption token to the purchaser terminal while requesting provision of at least one fingerprint image of the purchaser;

obtaining said at least one fingerprint image from the purchaser at a reader device associated with the purchaser terminal, wherein said at least one fingerprint image is not included within the credit card information contained on the credit card;

encrypting said at least one fingerprint image using said encryption token in said reader device, said reader device being connected as an add-on unit to said purchaser terminal whereat said purchase transaction is initiated;

transmitting said credit card information and said obtained at least one fingerprint image in encrypted form from said reader device to the purchaser terminal;

transmitting said credit card information and said obtained at least one fingerprint image in encrypted form from the purchaser terminal to said credit card database;

decrypting from said encrypted form said credit card information and said obtained at least one fingerprint image in said credit card database;

processing said decrypted credit card information and at least one fingerprint image to be matched with stored personal information in said credit card database including at least one fingerprint of the owner of the credit card; and providing a message to said purchaser terminal in accordance with the results of said processing step for completion of said purchase transaction.

16. The method of claim 15 wherein said encryption token contains unique information for one-time use only, such as date, time, location and the like.

17. The method of claim 15 wherein the purchaser terminal comprises a computer and said reader device is a stand-alone device, and wherein said obtaining and transmitting steps performed by said reader device are performed in isolation external to said computer and not via direct access to the Internet, thereby protecting said obtained at least one fingerprint image and allowing its encryption before transmission.

* * * * *